Patented Apr. 14, 1953

2,635,080

UNITED STATES PATENT OFFICE 2,635,080

REACTIVATING A SUPPORTED PLATINUM CATALYST

Herbert R. Appell, Chicago, Ill., assignor to Universal Oil Products Company, Chicago, Ill., a corporation of Delaware No Drawing. Application March 17, 1950, Serial No. 150,347

6 Claims. (Cl. 252—412)

This invention relates to the recovery of noble metals and more particularly to a novel process for removing noble metals from composites of said noble metals with a metal oxide without dissolving said metal oxide.

Prior practices for the recovery of noble metals have included the use of aqua regia for this purpose. However, this practice has the disadvantage, when the noble metal is in association with a metal oxide, to also dissolve the metal oxide. In many cases, it is desired to separate the noble metal from the oxide and, in other cases, it is desired to recover or remove the noble metal from the metal oxide without destroying the physical characteristics of the metal oxide, but these objectives cannot be accomplished by the prior art practice of using aqua regia. The present invention offers a novel method of accomplishing these objectives.

Noble metals find particular utility for use as catalysts for the conversion of organic compounds and particularly hydrocarbons. The noble metals preferably are in association with a metal oxide, generally in the form of particles of uniform or irregular size and shape. After use in the process, the catalyst loses its activity and it becomes necessary to subject the catalyst to suitable treatment in order to restore the activity thereof. In one embodiment the present invention offers a novel method of restoring the activity of used catalysts by treatment in the manner to be hereafter set forth to dissolve the platinum without dissolving the metal oxide to a substantial extent. The metal oxide then may be reimpregnated with additional quantities of the noble metal if desired.

In one embodiment the present invention relates to a method of removing a noble metal from a composite of said noble metal and a metal oxide which comprises treating said composite with a mixture of a metal nitrate and a metal chloride.

In a specific embodiment the present invention relates to a method of reactivating a platinum-alumina catalyst which comprises treating said catalyst with a mixture of an aqueous solution of aluminum nitrate and an aqueous solution of aluminum chloride, and dissolving a substantial portion of said platinum without dissolving said alumina to a substantial extent.

The noble metals for treatment in accordance with the present invention include platinum, palladium, gold, silver, iridium, rhodium, ruthenium, osmium, etc. As hereinbefore set forth, these noble metals are generally associated with a metal oxide and particularly an oxide of a metal in the left hand columns of groups III to VIII of the periodic table including particularly the oxides of aluminum, titanium, zirconium, hafnium, thorium, vanadium, tantalum, antimony, chromium, molybdenum, tungsten, uranium, manganese, cobalt, nickel, etc. It is understood that the catalyst may comprise two or more noble metals and/or two or more metal oxides. In still other cases, one or more activating components may be included in the catalyst. These activating components generally are acidic and include halides, particularly chlorides and fluorides, other mineral acids, organic acids, etc., the acidic component or components undoubtedly being associated with the metal oxide and/or metal in a combined state.

As hereinbefore set forth, the composite of noble metal or metals with metal oxide or metal oxides is particularly suitable for use as catalysts for effecting reactions of organic compounds and particularly hydrocarbons including such reactions as dehydrogenation, hydrogenation, cyclization, hydrocracking, reforming, oxidation, etc. These reactions are well known in the prior art and the operating conditions such as temperature, pressure, etc. required are described in detail therein.

The novel features of the present invention are particularly adapted to the reactivation of alumina - platinum - combined halogen catalysts which recently have been found to be of particular advantage for use in the reforming of gasoline. In the interest of simplicity, the following description will be directed primarily to the reactivation of a catalyst of this type, with the understanding that the novel features of the invention may be applied to other noble metals and other catalyst compositions.

In accordance with the invention, the catalyst composite is treated with a mixture of a metal nitrate and a metal chloride in an aqueous menstruum. Because it usually is desired to avoid mixing the metal oxide with other metal oxides, it is preferred that the metal nitrate and metal chloride correspond to the metal in the metal oxide. Thus, when the metal oxide in the catalyst composite comprises alumina, aluminum nitrate and aluminum chloride are utilized. Similarly, when the metal oxide comprises zirconia, zirconium nitrate and zirconium chloride are employed, etc.

The metal nitrate and metal chloride are generally prepared as aqueous solutions and utilized in this manner for ease in handling and to insure complete reaction. The proportions of metal nitrate to metal chloride may vary considerably and thus may be within the range of from 1 part metal nitrate and 9 parts metal chloride to 9 parts metal nitrate and 1 part metal chloride. However, in general, it is preferred to use an excess of metal nitrate over the metal chloride and preferred solutions comprise from about 3 to about 8 parts metal nitrate to 1 part metal chloride. This is particularly preferred in the case of the alumina-platinum catalysts because this ratio introduces less chloride most of which must be removed in a later step.

The treatment with the mixed metal salts may be effected at any suitable temperature which, in general, is preferably within the range of from about 150° to about 220° F. The reason that elevated temperatures are preferred is that the reaction is expedited by elevated temperature and, therefore, is accomplished in a shorter time.

In one embodiment of the invention, the metal nitrate and metal chloride may be prepared as a mixed solution or as separate solutions and may be commingled to form a common solution, and this solution then is commingled with the catalyst composite. In another embodiment of the invention, the solution of metal nitrate or metal chloride first may be commingled with the catalyst and then the other solution is subsequently added thereto. Treatment of the catalyst composite with the metal salts may be effected in any suitable manner, which may be batch or continuous type of operation. One particularly suitable method is to charge the catalyst composite and metal salt solutions to a suitable zone, heat the mixture to refluxing temperature, and maintain the same under these conditions for the desired time. The time of heating and refluxing will vary but, in general, will be within the range of from about 0.25 to 12 hours or more.

After the reaction has proceeded to the desired extent, the liquid containing noble metal dissolved therein is separated from the undissolved metal oxide in any suitable manner, such as by draining, decanting, etc. The liquid fraction may then be treated in any suitable manner to recover the noble metal from the metal salt solutions, such as by precipitation of the noble metal with a metal lower in the electromotive series. Thus, in my particular example, platinum is precipitated with aluminum, the platinum is separated from the solution, and the solution may be reused within the process, either without further treatment or as desired.

The process as hereinbefore described will remove a substantial portion of the noble metal from the metal oxide without dissolving the metal oxide to a substantial extent. The metal oxide is preferably washed with water and, when desired, is treated by any suitable method, such as by ion exchange with ammonium nitrate, to remove excess chlorides, and then is washed with water and finally dried at a temperature of from about 200° to about 600° F. for a period of from about 2 to 12 hours or more, after which the metal oxide may be calcined, if desired, at a temperature of from about 700° to about 1200° F. for a period of from about 1 to 12 hours or more.

The alumina-platinum-combined halogen catalyst hereinbefore referred to is generally subjected to this treatment after the catalyst had been used in the reforming of gasoline to improve the octane number thereof. The catalyst is usually contaminated with carbonaceous deposits formed in the reforming process. The carbonaceous deposits may be removed from the catalyst by burning in air at a temperature of from about 700° to about 1100° F, for a period of from about 1 to 12 hours or more, and this burning operation may be effected either before or after the catalyst composite is treated with the metal salts in the manner herein set forth.

The metal oxide recovered in the above manner is preferably reimpregnated with the noble metal for use as a catalyst. Specifically, the alumina as recovered is reimpregnated with platinum and, when desired, halogen, to form a catalyst for use in the reforming process. In one embodiment of the invention, the alumina is dried and calcined prior to reimpregnation with platinum or in another embodiment the reimpregnation is effected before the drying and calcining. When the alumina had been dried prior to reimpregnation, the reimpregnation with platinum is preferably effected by means of a soluble platinic compound such as chloroplatinic acid, ammonium platinum chloride, trimethylbenzyl ammonium platinum chloride, tetramino platino chloride or other suitable platinum compounds, and in the presence of a suitable basic medium and particularly ammonium hydroxide. The use of ammonium hydroxide in this manner serves to effect uniform distribution of the platinum throughout and within the alumina. When the platinum is added to the wet pills, the reimpregnation is preferably effected by treating chloroplatinic acid with hydrogen sulfide to form a complex product which is then incorporated in the alumina pills. This again serves to effect uniform distribution of the platinum.

When a halogen is to be combined in the catalyst, the halogen may be added in any suitable manner and either before or after addition of the platinum. Fluorine, for example, is added in the form of an aqueous hydrogen fluoride solution. The amount of chloroplatinic acid and hydrogen fluoride solution, when used, are regulated to give the desired concentration of these components in the catalyst which in general will be from about 0.01% to about 1% or more of platinum and from about 0.1% to about 3% or more by weight of combined fluorine. Other halogens may be added in different amounts which usually will be within the range of from about 0.1% to about 8% by weight of the catalyst. It generally is desirable to give this catalyst a final drying and calcining treatment, these being effected at the temperatures hereinbefore set forth.

The novelty and utility of the present invention is illustrated further in the following examples, with the understanding that it is not intended to limit the invention to these specific examples.

Example I

The catalyst used in the following examples comprised alumina, 0.3% by weight of platinum, 0.12% by weight of combined fluorine and 0.45% by weight of combined chlorine and was in the form of 1/8" x 1/8" pills. This catalyst had been used for the reforming of a Mid-Continent naphtha for a period of one hundred thirty-nine (139) days in a pilot plant operation. In order to compare on an equal basis the activity of the catalyst as received from the pilot plant and after treatment in the manner herein set forth, different samples of the catalyst were utilized in the reforming of a Mid-Continent naphtha in a test unit operating at a temperature of 977° F., a pressure of 300 p. s. i. and utilizing a hydrogen: hydrocarbon mol ratio of 1.8:1. Each test was continued for a period of 18 hours.

When tested in this manner, the catalyst as received from the pilot plant produced a gasoline product having an initial specific dispersion of 136.2 but after 18 hours of operation the specific dispersion of the gasoline product dropped to 115.8. The specific dispersion of the gasoline product is an indication of the aromatic content of the gasoline. A high specific dispersion indicates a high aromatic content and conversely a low specific dispersion indicates a low aromatic content.

Example II

Because the catalyst treated in accordance with the present invention was also subjected to calcination in air to burn off carbonaceous deposits, the present example is being introduced to show the results obtained solely by burning off the carbonaceous deposits from the catalysts. This was effected by subjecting another sample of the catalyst as received from the pilot plant to calcination in a stream of air at a temperature gradually increasing to 925° F. and held at that temperature for one hour. When tested in the manner hereinbefore set forth, this regenerated catalyst produced a gasoline product having an initial specific dispersion of 140.3 which, after 18 hours, fell to 125.6. This, therefore, shows that the burning of the carbonaceous deposits from the catalyst, while restoring the initial activity of the catalyst, did not restore the life of the catalyst because the specific dispersion of the product fell to 125.6.

Example III 50 grams of the catalyst as received from the pilot plant were calcined in the presence of air at a temperature of 700° F. and were reduced in the stream of hydrogen at a temperature of 840° F. The catalyst pills were then extracted for 6 hours with a solution of 25 grams of hydrated aluminum nitrate and 5 grams of aluminum chloride hexahydrate in 70 ml. of water. The pills were washed with water and calcined for one hour at 932° F. The pills were then reimpregntaed with 0.2% by weight of platinum by soaking the pills in an aqueous chloroplatinic acid solution in the presence of ammonium hydroxide. This brought the platinum concentration back to its original value.

This catalyst when tested in the manner hereinbefore set forth produced a gasoline product having an initial specific dispersion of 141.2 which after 18 hours fell to 134.5. It will be noted that the initial specific dispersion of the gasoline product was higher than those produced with the catalysts as received or after air oxidation alone but more important that the specific dispersion fell only to 134.5 after 18 hours as compared to 115.8 and 125.6 respectively. Treatment in the manner herein set forth removed about 70% of the platinum from the catalyst but showed no noticeable dissolution of the alumina. Further, the structural strength of the alumina pills was not impaired by this treatment.

Example IV

Further tests conducted in substantially the same manner as described in Example III, but using varying concentrations of aluminum nitrate and aluminum chloride solutions, produced substantially equal results. Thus, for example, in another operation, the treating solution comprised 45 grams $Al(NO_3)_3.9H_2O$, 5 grams $AlCl_3.6H_2O$ and 50 ml. of water. Still another operation utilized a treating solution of 37 grams $Al(NO_3)_3.9H_2O$, 3 grams $AlCl_3.6H_2O$ and 60 ml. of water. The reaction was completed in three hours with the former solution and in four hours with the latter solution. The extraction was considered complete when the pills no longer became lighter in color.

Example V

In order to show that the presence of both the aluminum nitrate and aluminum chloride is essential in this treatment, another test was conducted in substantially the same manner as set forth in Examples III and IV but using only 25 grams of $Al(NO_3)_3.9H_2O$ in 74 ml. of water. The reaction was incomplete after 8 hours and was then discarded as proving unsatisfactory for the purpose intended.

Example VI

Examples III and IV are indicative of the results obtained when the carbon is burned from the catalyst before treatment with the metal salt solutions. This example shows the results obtained when the calcination is effected after the treatment with metal salts. In this example, 55 grams of the catalyst as received from the pilot plant were extracted for 6 hours at reflux temperature with a solution of 37 grams of aluminum nitrate nonahydrate and 3 grams of aluminum chloride hexahydrate in 60 ml. of water. The catalyst pills were then well rinsed and extracted twice with 50 ml. portions of 5% ammonium nitrate to remove excess chlorine, after which the catalyst was washed with water, calcined at 932° F. for 1 hour and reimpregnated with 0.15% platinum.

This catalyst when tested in the same manner as hereinbefore set forth produced a gasoline product having an initial specific dispersion of 137.7 and a final specific dispersion of 131.2. It will be noted that the final specific dispersion is considerably better than those obtained with the original catalyst and with the catalyst subjected to oxidation only.

I claim as my invention:

1. A method of recovering platinum from a spent catalyst containing platinum supported on aluminia which comprises treating said catalyst with an aqueous solution of aluminum nitrate and aluminum chloride and dissolving a substantial portion, at least, of the platinum in said solution without dissolving said alumina to a substantial extent.

2. A method of reactivating a spent catalyst containing platinum supported on alumina which comprises treating said catalyst with an aqueous solution of aluminum nitrate and aluminum chloride and dissolving a substantial portion, at least, of the platinum in said solution without dissolving said alumina to a substantial extent, and subsequently reimpregnating the alumina with platinum.

3. A method of recovering platinum from a composite of platinum and alumina, which comprises treating said composite with a mixture of aluminum nitrate and aluminum chloride in an aqueous menstruum and dissolving a substantial portion of the platinum in said mixture without dissolving said alumina to a substantial extent.

4. A method of reactivating an alumina-platinum composite containing carbonaceous deposits which comprises treating said catalyst with a mixture of a solution of aluminum nitrate and a solution of aluminum chloride, dissolving a substantial portion of the platinum in said mixture without dissolving said alumina to a substantial extent, separating the solution from the alumina, washing the alumina so recovered, drying the same and calcining in the presence of air at a temperature of from about 700° to about 1200° F. to burn off said carbonaceous deposits, and reimpregnating it with further quantities of platinum.

5. A method of reactivating an alumina-platinum composite containing carbonaceous deposits which comprises calcining said composite in the presence of air at a temperature of from about 700° to about 1200° F. to burn off said carbonaceous deposits, treating the resultant composite with a mixture of a solution of aluminum nitrate and a solution of aluminum chloride and dissolving a substantial portion of the platinum therein without dissolving alumina to a substantial extent, separating the solution from alumina and washing and drying the alumina, thereafter reimpregnating said alumina with further quantities of platinum.

6. A method of reactivating an alumina-platinum-combined halogen catalyst which comprises treating said catalyst at a temperature of from about 150° to about 220° F. with a mixture of a solution of aluminum nitrate and a solution of aluminum chloride, dissolving a substantial portion of platinum in said solution without dissolving alumina to a substantial extent, separating the solution from the alumina, treating said alumina with an aqueous solution of ammonium nitrate to remove excess chlorine, and reimpregnating the alumina with further quantities of platinum.

HERBERT R. APPELL.

References Cited in the file of this patent

UNITED STATES PATENTS

| Number | Name | Date |
|---|---|---|
| 1,533,031 | Sauer | Apr. 7, 1925 |
| 2,006,221 | Ridler | June 25, 1935 |
| 2,344,208 | Kirkpatrick | Mar. 14, 1944 |